United States Patent [19]

Rubenstein

[11] 4,293,580

[45] Oct. 6, 1981

[54] FROZEN FRUIT AND VEGETABLE JUICES

[75] Inventor: Irving H. Rubenstein, Owings Mills, Md.

[73] Assignee: Maryland Cup Corporation, Owings Mills, Md.

[21] Appl. No.: 96,889

[22] Filed: Nov. 23, 1979

[51] Int. Cl.³ .................. A23L 2/02; A23L 2/16; A23G 9/00
[52] U.S. Cl. .................................. 426/565; 426/599
[58] Field of Search ............... 426/565, 566, 567, 599

[56] References Cited

U.S. PATENT DOCUMENTS

| | | | |
|---|---|---|---|
| 1,963,938 | 6/1934 | Cover | 426/565 |
| 2,131,650 | 9/1938 | Webb | 426/565 |
| 2,651,575 | 9/1953 | Talburt | 426/565 |
| 3,119,699 | 1/1964 | Gunther | 426/599 |
| 3,492,126 | 1/1970 | Rubenstein | 426/565 |
| 3,922,361 | 11/1975 | Vann | 426/599 |

OTHER PUBLICATIONS

Fisk, The Book of Ice Cream, MacMillan Co., 1919, pp. 78–79.

*Primary Examiner*—Jeanette M. Hunter
*Attorney, Agent, or Firm*—Birch, Stewart, Kolasch & Birch

[57] ABSTRACT

Fruit and vegetable juice concentrates, such as orange juice, are prepared by simultaneously whipping and freezing a concentrate in the presence of whipping agents and, optionally, stabilizers. Suitable whipping agents to be employed include soya proteins and egg whites. The resulting concentrated juice is discharged from, e.g., an ice cream freezer at a temperature of 18°–30° F. The frozen fruit concentrate has a soft whipped texture, which makes it divisible into aliquot portions for use by a consumer.

17 Claims, No Drawings

FROZEN FRUIT AND VEGETABLE JUICES

This invention relates to the preparation of frozen fruit and vegetable juices and, more particularly, to the preparation of orange juice or other fruit juice or vegetable juice concentrates wherein the concentrate is simultaneously whipped and frozen.

U.S. Pat. Nos. 3,343,967 and 3,525,624 of the present inventor are directed to stabilizer compositions utilized in the whipping and freezing of aqueous systems in ice cream freezers. Modifications of this procedure are taught in U.S. Pat. Nos. 3,503,757 and 3,543,695, also of the present inventor.

An extension of some of this work is set forth in U.S. Pat. No. 3,492,126, which describes a process for making a soft frozen whipped aqueous extract concentrate of coffee or tea.

The present invention represents yet another advance in this field of technology wherein orange juice, or other fruit or vegetable juice concentrates, is prepared in the conventional manner, except that instead of freezing the concentrated juice in its liquid state, appropriate whipping agents and stabilizers are added thereto, and then the juice concentrate is simultaneously whipped and frozen. The finished fruit or vegetable juice whipped concentrate can then be sold to the consumer. Since the concentrate goes directly to a whipping/freezing system wherein it is discharged at a low temperature such as 22° F., it retains most of the volatile flavor elements that normally are lost during the slow freezing process now used for consumer and institutional packages of frozen fruit and vegetable juices, and particularly orange juice.

An additional advantage of the present invention is that the consumer may take a tablespoon or two of the whipped juice concentrate and, for example, add it to water to prepare single strength orange juice. Since the juice goes directly from the frozen state to the beverage consistency state in accordance with the present invention, there is minimal flavor loss. A natural foaming also occurs which tends to add a favorable influence to the flavor of the product.

An additional advantage of the present invention is that only as much juice as is needed need be defrosted for the preparation of the single strength juice portion. Under ordinary circumstances, a complete package must be reconstituted. However, the product produced in accordance with this invention is in a form such that a consumer need only use as much concentrate as is necessary, and the balance can be returned to the freezer.

Yet another advantage of the invention is the fact that air or gas is inherently incorporated into the concentrate, which means that it can be easily dipped and will not have the sticky consistency of standard frozen juices, such as orange juice.

These and other advantages and benefits of the present invention will become apparent to those skilled in the art from a consideration of the following specification and claims.

As noted above, the conventional technique for the manufacture of frozen orange juice concentrate comprises removing a part of the water of a single strength juice by means of heat and vacuum. This process of removing the water is continued until the juice has been concentrated to $\frac{1}{3}$ to 1/7, preferably $\frac{1}{3}$ to 1/6, of its original volume. This procedure is conducted with or without a concurrent operation for the recovery of flavor essences from the distillate of the system. The essence recovered can either be separated from the juice or returned to the concentrate so as to enable the concentrated juice to have a flavor which is as close to the original flavor as possible. The finished juice concentrate can then be packaged and frozen, or can be partially diluted with fresh juice to add a fresh juice flavor thereto prior to packaging for consumer use as a frozen food concentrate.

The consumer is instructed on the label of the finished package to defrost the frozen juice and then to add an appropriate amount of water to reconstitute the frozen concentrate to a single strength juice. However, in order to effectively reconstitute the juice, it is necessary that the user either defrost the entire package of concentrate to a liquid consistency or else blend the container of frozen concentrate with an appropriate amount of water, followed by vigorous agitation until the frozen concentrate has melted and blended with the water to provide the final product.

Thus, the present invention makes it possible to eliminate the need for defrosting an entire container of juice in order to be able to serve only a single portion.

In the procedure of the present invention, the juice is concentrated in the conventional manner with or without essence recovery. During this operation, a measured amount of fresh juice is prepared to which are added a quantity of a whipping protein (for example, derived from a soy protein or from egg white) and a small amount of stabilizer. While soya proteins and egg whites are preferred protein whips to be employed in the present invention, a whipping system based on a variety of other techniques can be employed, including the use of various emulsifiers such as glycerol monostearate and stearoyl-2-lactylates as described in copending application Ser. No. 851,761.

A soya based whipping protein, with or without the addition of phosphate salts, is readily soluble in water, and for this purpose can be used in a concentration of 0.05 to 2 percent by weight, depending on the source of the protein and the final product desired. Liquid egg white can be used in a concentration of 0.5 to 3 percent, and it too is water-soluble.

The stabilizer to be employed in accordance with the present invention can be an all-natural gum such as locust bean gum, guar gum, carrageenans, agar, or any other material which will add viscosity to an aqueous system. A synthetic gum such as carboxymethylcellulose can be used. The choice of gums depends primarily on two factors, i.e., the need for having an all natural product and the texture desired in the finished drink.

In many cases, it is desirable to use a cold swelling gum such as guar gum or carboxymethylcellulose. However, there is no objection to dissolving a gum in, for example, a hot orange juice concentrate, prior to the addition of the single strength juice thereto.

When the whipping protein and the stabilizers have been added to either the juice concentrate or the single strength juice, the single strength juice portion (which may constitute about 0% to 90% by weight of the total) and the concentrate portion are blended, and while still hot, pass through a whipping/freezing system in a similar manner as in the making of ice cream. In this system, the finished concentrated juice is whipped, frozen and discharged at a temperature in the range of from 18° to 30° F. and then packaged for consumer use.

By means of the present invention, the finished product is in the form of a soft whipped fruit concentrate when kept at normal household freezer temperatures of $-10°$ F. to $+10°$ F.. Because of the soft whipped texture of this fruit concentrate when frozen, the consumer has the advantage of being able to take a package of frozen juice, spoon out a portion into a cup and then simply add cold water to prepare a single strength juice. After the consumer has spooned out the portion from the frozen package, the remainder can be returned to the freezer for use at a future time. This is in contrast to the conventional juices as known in the art which do not lend themselves to division into aliquot portions but require immediate defrosting of the entire contents of a package.

Clearly, the advantage of being able to spoon out only a small portion for reconstitution, rather than an entire package, provides the benefit of a better juice flavor, since flavor changes occur rapidly when juice is reconstituted and allowed to stand even at refrigerator temperatures.

Manufacture of the fruit or vegetable juice concentrate in accordance with the invention can be conducted in an atmosphere of air. If oxidation should prove to be a problem, for example, with orange juice, where there is a need to control oxidation of the orange oils in which the aldehydes oxidize to lower flavor levels, and the terpenes oxidize to certain unpleasant flavor levels, the procedure may be conducted in the presence of an inert gas such as nitrogen or carbon dioxide.

If desired, ascorbic acid can be added to the concentrate for vitamin C fortification.

The following examples are given merely as illustrative of the present invention and are not to be considered as limiting. Unless otherwise noted, the percentages therein and throughout the application are by weight.

EXAMPLE 1

A typical orange juice concentrate may be manufactured in accordance with the invention in the following manner.

The ingredients employed are as follows:
Orange juice concentrate (67 Brix) (approximately 5+1 concentration)—1,000 parts
Single strength orange juice—400 parts
Whipping proteins (Gunther 157A)—10 parts
Guar gum—5 parts The guar gum and whipping protein are dissolved in the cold orange juice, added to the hot concentrate and then passed through an ice cream freezer incorporating air and increasing the volume from ten to one hundred percent with the final product discharging from the ice cream freezer at a temperature of 19°–30° F., preferably 22° F.. Assuming an increase of fifty percent in volume, it would then be desirable to reconstitute the juice by adding two parts of water to one part of the orange juice whip. The water and the concentrate are blended and stirred until the drink is ready.

EXAMPLE 2

The following formulation may be employed where it is desirable to minimize aeration as well as to minimize foam in the finished drink.
Orange juice concentrate (67 Brix) (approximately 5+1 concentration)—1,000 parts
Single strength orange juice—400 parts
Whipping protein (Gunther D100)—5 parts
Carboxymethylcellulose—4 parts This formulation is then passed through an ice cream freezer for simultaneous whipping/freezing as described hereinabove.

EXAMPLE 3

In the same manner as described in Example 1, and as an alternative thereto, locust bean gum, a hot soluble gum, can be used by dissolving the gum in the following hot juice concentrate formulation:
Orange juice concentrate (67 Brix) (approximately 5+1 concentration)—1,000 parts
Sugar—400 parts
Whipping protein (D157A)—5 parts
Locust bean gum—5 parts

EXAMPLE 4

In accordance with the procedure of Example 1, the following formulation, utilizing a higher level of whipping protein, can be used to reconstitute the beverage as a foaming drink in a blender or as a milkshake:
Orange juice concentrate (67 Brix) (approximately 5+1 concentration)—1,000 parts
Single strength orange juice—400 parts
Whipping protein (D157A)—10 parts
Lamda carrageenan—2 parts

EXAMPLE 5

Again, in the same manner as described in Example 1, an orange juice concentrate can be prepared from the following formulation, which takes advantage of the synergism of locust bean gum with Kapa carrageenan as an alternative stabilizing system:
Orange juice concentrate (67 Brix) (approximately 5+1 concentration)—1,000 parts
Single strength orange juice—400 parts
Whipping protein—5 parts
Locust bean gum—3 parts
Kapa carrageenan—1 part

EXAMPLE 6

In the manner as described in Example 1, an orange juice concentrate can be prepared from the following formulation where economy is a prime factor. In this case, it is possible to substitute water for the single strength orange juice while using a greater amount of concentrate.
Orange juice concentrate (67 Brix) (approximately 5+1 concentration)—1,065 parts
Water—335 parts
Whipping protein—5 parts
Guar gum—5 parts

EXAMPLE 7

Egg white is an alternative to the whipping proteins. In some circumstances where label requirements might preclude the use of a whipping protein, the use of an egg white might be more desirable. A typical formulation would be as follows, wherein the product is again prepared in the manner described in Example 1.
Orange juice concentrate (67 Brix) (approximately 5+1 concentration)—1,000 parts
Single strength orange juice—400 parts
Dry egg albumin—15 parts
Guar gum—5 parts

EXAMPLE 8

A juice drink can be made by taking the whipped frozen juice from any of Examples 1-7 and diluting it with three to six times its volume of water, adding a quantity of sugar and whipping the entire mixture in a blender with the following formulation:
Frozen whipped concentrate—1,000 parts
Water—5,000 parts
Sugar—500 parts

EXAMPLE 9

In the manner described in Example 1, an apple juice concentration may be made from the following formulation:
Apple juice concentrate (76 Brix)—900 parts
Water—500 parts
Whipping protein—5 parts
Locust bean gum—5 parts

EXAMPLE 10

A pineapple juice concentrate can be made from the following formulation:
Pineapple juice concentrate (approximately 5+1 concentration)—1,050 parts
Water—450 parts
Whipping protein—5 parts
Guar gum—5 parts

EXAMPLE 11

A tomato juice concentrate which can be reconstituted to a standard tomato juice can be prepared in the manner as described in Example 1 from the following typical formulation:
Tomato concentrate (60 Brix)—1,100 parts
Water—400 parts
Whipping protein—5 parts
Guar gum—5 parts In the foregoing Examples, the gum can either be dissolved in the hot concentrate, or in the case of the guar gum, into cold water.

It should be apparent that the present invention may be applied to a variety of fruit and vegetable juices, including citrus juices such as orange, pineapple and grapefruit juices, various fruit and berry juices such as apple and cranberry juice and vegetable juices such as tomato juice.

Although it is preferred to employ a stabilizer in the formulation as shown above, normally in amounts of about 0.01 to 2.0% by weight, it is possible to omit the stabilizer, although it is to be recognized that the shelf life of the resulting product would thus be decreased.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A method for the preparation of a soft-frozen whipped fruit or vegetable juice concentrate which comprises the steps of:
   adding one or more whipping proteins or emulsifiers to single strength juice in an amount effective to whip the resulting juice concentrate mixture;
   blending the single strength juice containing the whipping proteins or emulsifiers in an amount ranging from greater than 0% to 90% by weight of the total with a fruit or vegetable juice concentrate; and
   subjecting the resulting mixture to simultaneous whipping and freezing at a temperature of about 18° to 30° F. to provide said soft-frozen whipped concentrate.

2. The method of claim 1, wherein the whipping and freezing step is conducted in an atmosphere of an inert gas.

3. The method of claim 1, wherein the whipping proteins comprise soya proteins.

4. The method of claim 3, wherein the amount of soya protein in the whipped concentrate is about 0.05 to 2% by weight.

5. The method of claim 1, wherein the whipping proteins comprise egg whites.

6. The method of claim 5, wherein the amount of egg white in the whipped concentrate is about 0.5 to 3% by weight.

7. The method of claim 1, wherein the juice concentrate is a citrus juice selected from the group consisting of orange, pineapple and grapefruit juices.

8. The method of claim 1, wherein the juice concentrate is a fruit or berry juice selected from the group consisting of apple and cranberry juices.

9. The method of claim 1, wherein the juice concentrate is tomato juice.

10. A soft-frozen whipped fruit or vegetable juice concentrate made by the method of claim 1.

11. A method for the preparation of a soft-frozen whipped fruit or vegetable juice concentrate which comprises the steps of:
    adding one or more whipping proteins or emulsifiers to single strength juice in an amount effective to whip the resulting juice concentrate mixture;
    adding one or more stabilizers to said single strength juice or to the juice concentrate prior to blending with said single strength juice in an amount ranging from about 0.01 to 2.0% by weight;
    blending the single strength juice containing the whipping proteins or emulsifiers in an amount ranging from greater than 0% to 90% by weight of the total with a fruit or vegetable juice concentrate; and
    subjecting the resulting mixture to simultaneous whipping and freezing at a temperature of about 18° to 30° F. to provide said soft-frozen whipped concentrate.

12. The method of claim 11, wherein the whipping and freezing step is conducted in an atmosphere of an inert gas.

13. The method of claim 11, wherein the stabilizers comprise natural or synthetic gums.

14. The method of claim 12, wherein the stabilizer is a gum selected from the group consisting of locust bean gum, guar gum, carrageean, agar and carboxymethylcellulose.

15. The method of claim 11, wherein the whipping proteins comprise soya proteins or egg whites and the emulsifiers comprise glycerol monostearate or stearoyl-2-lactylates.

16. The method of claim 11, wherein the juice concentrate is orange juice.

17. A soft-frozen whipped fruit or vegetable juice concentrate made by the method of claim 11.

* * * * *